US007303177B2

(12) United States Patent
Harcombe

(10) Patent No.: US 7,303,177 B2
(45) Date of Patent: Dec. 4, 2007

(54) ACTUATOR ARRANGEMENT AND FUEL INJECTOR INCORPORATING AN ACTUATOR ARRANGEMENT

(75) Inventor: Anthony Thomas Harcombe, Richmond (GB)

(73) Assignee: Delphi Technologies, Inc., Troy, MI (US)

(*) Notice: Subject to any disclaimer, the term of this patent is extended or adjusted under 35 U.S.C. 154(b) by 139 days.

(21) Appl. No.: 11/302,008

(22) Filed: Dec. 13, 2005

(65) Prior Publication Data

US 2006/0124775 A1 Jun. 15, 2006

(30) Foreign Application Priority Data

Dec. 13, 2004 (GB) .................................... 0427276
Aug. 1, 2005 (GB) .................................... 0515819

(51) Int. Cl.
*F16K 31/02* (2006.01)
*H01F 7/10* (2006.01)

(52) U.S. Cl. .................... 251/129.09; 239/96; 335/250

(58) Field of Classification Search .................. 239/88, 239/96, 585.1; 251/129.09; 335/250, 251, 335/256
See application file for complete search history.

(56) References Cited

U.S. PATENT DOCUMENTS 2,394,103 A 2/1946 Rader
4,531,679 A * 7/1985 Pagdin .................... 239/585.1
5,488,340 A * 1/1996 Maley et al. ............... 335/253
5,538,220 A * 7/1996 LaMarca ............... 251/129.15
5,608,368 A * 3/1997 Ricco et al. ................ 335/281
5,865,373 A * 2/1999 Buckley et al. ............... 239/90
5,903,070 A * 5/1999 Gobel ......................... 310/17
5,939,963 A * 8/1999 Harcombe .................. 335/220
5,947,382 A * 9/1999 Kelly ......................... 239/127
6,155,503 A 12/2000 Benson et al.
6,405,940 B2 * 6/2002 Harcombe et al. ............ 239/88
6,789,778 B1 * 9/2004 Spahn et al. ........... 251/129.07
6,892,970 B2 * 5/2005 Nussio .................... 239/585.1

FOREIGN PATENT DOCUMENTS

EP 1 120 563 8/2001
GB 1 227 087 3/1971

OTHER PUBLICATIONS

European Search Report dated Apr. 24, 2007.

* cited by examiner

*Primary Examiner*—Thomas Moulis
(74) *Attorney, Agent, or Firm*—David P. Wood

(57) ABSTRACT

An actuator arrangement for use in a fuel injector of an internal combustion engine includes an inner core (30) comprising a plurality of laminates (30*a*) and a first outer pole (32) for receiving at least a part of the inner core (30), wherein the inner core (30) and the outer pole (32) together define a first volume (46) for receiving a first electromagnetic winding. An injector is provided in which the actuator arrangement controls a valve arrangement, either a spill valve or a nozzle control valve, or both, so as to control injection by the injector.

24 Claims, 5 Drawing Sheets

ACTUATOR ARRANGEMENT AND FUEL INJECTOR INCORPORATING AN ACTUATOR ARRANGEMENT

TECHNICAL FIELD

The present invention relates to an electromagnetic actuator arrangement. In particular, but not exclusively, the invention relates to an electromagnetic actuator arrangement for use in a fuel injector of an internal combustion engine. The invention also relates to an injector incorporating an electromagnetic actuator arrangement for controlling operation of one or more injector valves.

BACKGROUND OF THE INVENTION

It is known, for example from European Patent No EP 0987431 (Delphi Technologies Inc.), to provide a fuel injector with two independently operable valve arrangements for controlling fluid pressure within the injector, as shown in FIG. 1. The valve arrangements are arranged to control injection by an injector valve needle 10. Fuel is supplied to an injector delivery chamber 11 from a high pressure pump chamber 12, via a fuel supply passage 14, and movement of the valve needle 10 away from the seating permits fuel to flow from the injector delivery chamber 11 through one or more outlet openings 16 into the engine or other combustion space.

A first one of the valve arrangements is known as the control valve arrangement, or the nozzle control valve 18, and includes a control valve member which is operable to control fuel pressure in a control chamber 20. When the nozzle control valve 18 is in a first (open) position a communication path is opened between the control chamber 20 and a low pressure drain, and when the nozzle control valve 18 is in a second (closed) position the communication path is closed. The nozzle control valve member is biased into the closed position by means of a spring (not shown). There is a constant supply of high pressure fuel into the control chamber 20 so that when the nozzle control valve 18 is in the closed position, fuel pressure in the control chamber 20 is caused to increase.

A second one of the valve arrangements is a drain or spill valve arrangement 24 which controls whether pressurisation of fuel takes place within the pump chamber 12. The spill valve 24 serves to control whether the pump chamber 12, and hence the fuel supply passage 14, communicates with the low pressure drain, or whether the communication path between the fuel supply passage 14 and the low pressure drain is closed. When the spill valve 24 is in a first (open) position the fuel supply passage 14 communicates with the low pressure drain and when the spill valve 24 is in the second (closed) position communication between the fuel supply passage 24 and the low pressure drain is closed. The spill valve is biased into the open position by means of spring (not shown).

A surface associated with the valve needle 10 is exposed to fuel pressure within the control chamber 20, thereby applying a force to the valve needle 10 to urge the valve needle 10 towards its seating and closing the flow of fuel to the outlet openings 16. In this position, injection of fuel into the engine or other combustion space does not occur. In order to commence injection, the nozzle control valve 18 is actuated such that the control valve member is moved into its open position, thereby causing fuel pressure within the control chamber 20 to be reduced. The force urging the needle 10 towards its seating is therefore reduced and fuel pressure within the injector delivery chamber 11 acts on thrust surfaces of the valve needle 10 to lift the valve needle away from its seating to permit fuel to flow through the injector outlet openings 16.

In order to terminate injection, the nozzle control valve 18 is de-actuated such that the control valve member is moved into its closed position under the spring force, thereby closing the communication path between the control chamber 20 and the low pressure drain. The force acting on the valve needle 10 due to fuel pressure within the control chamber 20 is therefore increased, causing the valve needle 10 to be urged against its seating to terminate injection. The nozzle control valve 18 is therefore operable to control the pressure differential between the fuel in the control chamber 20 and the fuel in the injector delivery chamber 11, that is to say the differential in the pressure acting to close the needle 10 and the pressure tending to act to open it. In addition to the pressure of fuel in the control chamber 20 tending to urge the valve needle 10 to close, a closing spring 22 is provided to assist the aforementioned closing force.

Another method of terminating injection is to use the spill valve 24. When the spill valve 24 is in its open position, fuel flows from the fuel supply passage 14 and the injector delivery chamber 11 to the low pressure drain such that fuel pressure within the fuel supply passage 14 and the injector delivery chamber 11 is reduced. The resulting pressure differential between the control chamber 20 and the injector delivery chamber urges the valve needle 10 against its seating, closing the flow path to the outlet openings 16 and terminating injection. When the spill valve 24 is moved into its closed position and high pressure fuel is re-established within the injector delivery chamber 11, the valve needle 10 is caused to lift from its seating to commence injection.

The injector is provided with a twin, double pole actuator arrangement to control both the nozzle control valve 18 and the spill valve 24. The actuator includes first and second windings 26, 28, or solenoids, energisable to control movement of first and second armatures, 31, 32, respectively (i.e. a double pole actuator including the winding 26 controls the nozzle control valve 18, and a double pole actuator including the winding 28 controls the spill valve 24).

The first armature 31 is coupled to the nozzle control valve member so that energisation of the first winding causes the first armature 31, and hence the nozzle control valve member, to move between its closed and open positions. Energisation of the actuator thus causes the nozzle control valve member to move into the open position, whilst de-energising of the actuator causes the spill valve member to move into the closed position (under the influence of the spring).

The second armature 32 is coupled to the spill valve member so that energisation of the second winding 28 causes the second armature 32, and hence the spill valve member, to move between its open and closed positions. Energisation of the actuator causes the spill valve member to move into the closed position, whilst de-energising of the actuator causes the spill valve member to move into the open position under the influence of the spring.

In other injector designs, the nozzle control valve 18 is removed so that only a spill valve is provided. It is known here to provide an electromagnetic actuator having a single winding to control operation of the spill valve 24.

In another known injector, such as that described in EP 1120563 A (Delphi Technologies, Inc.), a nozzle control valve 18 and a spill valve 24 are provided as in FIG. 1 but the nozzle control valve is controlled by means of a single pole actuator, not a double pole actuator (i.e. there is no outer pole). An injector of this type is shown in FIG. 2. As in EP 0987431, the spill valve is controlled by means of a double pole actuator.

It is desirable to reduce the eddy current effects that exist in the actuator cores of the injectors of the aforementioned type. There is also a requirement to improve the flux density capability of the actuator.

It is one aim of the invention to provide an improved actuator arrangement which addresses these issues.

SUMMARY OF THE INVENTION

According to a first aspect of the invention, there is provided an actuator arrangement for use in a fuel injector of an internal combustion engine, including an inner core comprising a plurality of laminates or laminate layers and a first outer pole for receiving at least a part of the inner core. The inner core and the first outer pole together define a first volume for receiving a first electromagnetic winding.

Preferably, the inner core includes a main inner core body carrying a collar, so that the inner core body and the collar are formed from a plurality of laminates. Preferably, therefore, at least one of the laminates is different in its outer profile to its neighbouring laminate. The outer pole is preferably of annular or ring-like form.

Lamination of the inner core of the actuator arrangement provides benefits for the magnetic performance, whereas the use of a unitary (i.e. single piece) outer pole provides structural rigidity. A combination of the two features is therefore advantageous. It is particularly advantageous to laminate the inner core of the actuator arrangement as this part is of reduced diameter, so the cross section viewed in the direction of eddy currents is relatively large. The present invention therefore enables eddy current effects to be reduced.

In one preferred embodiment, the collar is arranged between an upper core region and a lower core region of the inner core. For example, the collar is carried part way along the primary axis of the inner core body so that an upper core region is on one side the collar and a lower core region is on the other side of the collar.

Preferably, therefore, the upper core region is received within the first outer pole so as to define, together with the first outer pole, the first volume for receiving the first electromagnetic winding.

The actuator arrangement may further comprise a second outer pole which defines, together with the lower core region, a second volume for receiving a second electromagnetic winding.

If a second winding is provided, the actuator finds particular application in a fuel injector having a spill valve and a nozzle control valve, wherein energisation and de-energisation of the first winding serves to control the spill valve and energisation and de-energisation of the second winding serves to control operation of the nozzle control valve. Where only a first winding is provided, the actuator arrangement is particularly suitable for application in a fuel injector having only a spill valve or a nozzle control valve.

In another embodiment, the first outer pole may have an extended length to receive both the upper core region and the lower core region, thereby to define, together with the upper core region, the first volume for receiving the first electromagnetic winding and to define, together with the lower core region, the second volume for receiving the second electromagnetic winding.

Alternatively, the first outer pole may be formed in two parts, a first part defining the first volume and a second part defining the second volume for receiving the second winding.

In one embodiment the collar engages, at diametrically opposed collar regions, respective diametrically opposed internal surfaces of the first outer pole so that the inner core and first outer pole fit together securely.

Preferably, the first outer pole includes a downwardly depending skirt, an internal surface of the downwardly depending skirt defining the diametrically opposed internal surfaces for engagement with the collar regions.

According to a second aspect of the invention, there is provided a fuel injector for use in an internal combustion engine, the fuel injector including a valve needle which is operable so as to control injection by the injector, a valve arrangement for controlling movement of the valve needle, and an actuator arrangement for controlling the valve arrangement. The actuator arrangement includes an inner core comprising a plurality of laminates and a first, annular outer pole for receiving at least a part of the inner core. The inner core and the first outer pole together define a first volume for receiving a first electromagnetic winding and whereby the valve arrangement is controlled by means of energisation and/or de-energisation of the first electromagnetic winding.

The preferred and/or optional features of the actuator arrangement of the first aspect of the invention are applicable to fuel injector of the second aspect of the invention, alone or in appropriate combination.

In one embodiment, the valve arrangement includes a spill valve for controlling fuel pressure within an injector supply passage, thereby to control movement of the valve needle.

In another embodiment the valve arrangement includes a nozzle control valve for controlling fuel pressure in an injector control chamber, thereby to control movement of the valve needle.

In a still further embodiment, the valve arrangement includes a spill valve for controlling fuel pressure within an injector supply passage and a nozzle control valve for controlling fuel pressure in an injector control chamber, thereby to control movement of the valve needle. Energisation and/or de-energisation of the first electromagnetic winding controls the spill valve, and the injector further comprises a second electromagnetic winding, wound on the lower core region, whereby energisation and/or de-energisation of the second electromagnetic winding controls the nozzle control valve.

A second outer pole may be provided to define, together with the lower core region, a second volume for receiving the second electromagnetic winding.

Alternatively, the first outer pole may have an extended length to receive the lower core region and to define, together with the lower core region, the second volume for receiving the second electromagnetic winding.

In a further alternative, the first outer pole may be formed in two parts, a first part defining the first volume and a second part defining the second volume.

According to a third aspect of the invention, there is provided a fuel injector for use in an internal combustion engine including a valve needle which is movable towards and away from a seating so as to control injection by the injector, a spill valve arrangement for controlling fuel pressure in an injector delivery passage, and a nozzle control valve arrangement for controlling fuel pressure in an injector control chamber so as to control movement of the valve needle. An actuator arrangement is provided for controlling both the spill valve arrangement and the nozzle control valve arrangement. The actuator arrangement includes an inner core comprising a plurality of laminates and a first outer pole for receiving at least a part of the inner core, the inner core including an upper core region wound with a first electromagnetic winding and a lower core region wound with a second electromagnetic winding. The inner core and the first outer pole together define a first volume within which the first electromagnetic winding is housed.

BRIEF DESCRIPTION OF DRAWINGS

The present invention will now be described, by way of example only, with reference to the accompanying drawings in which.

DETAILED DESCRIPTION OF PREFERRED EMBODIMENTS

Figure 2:
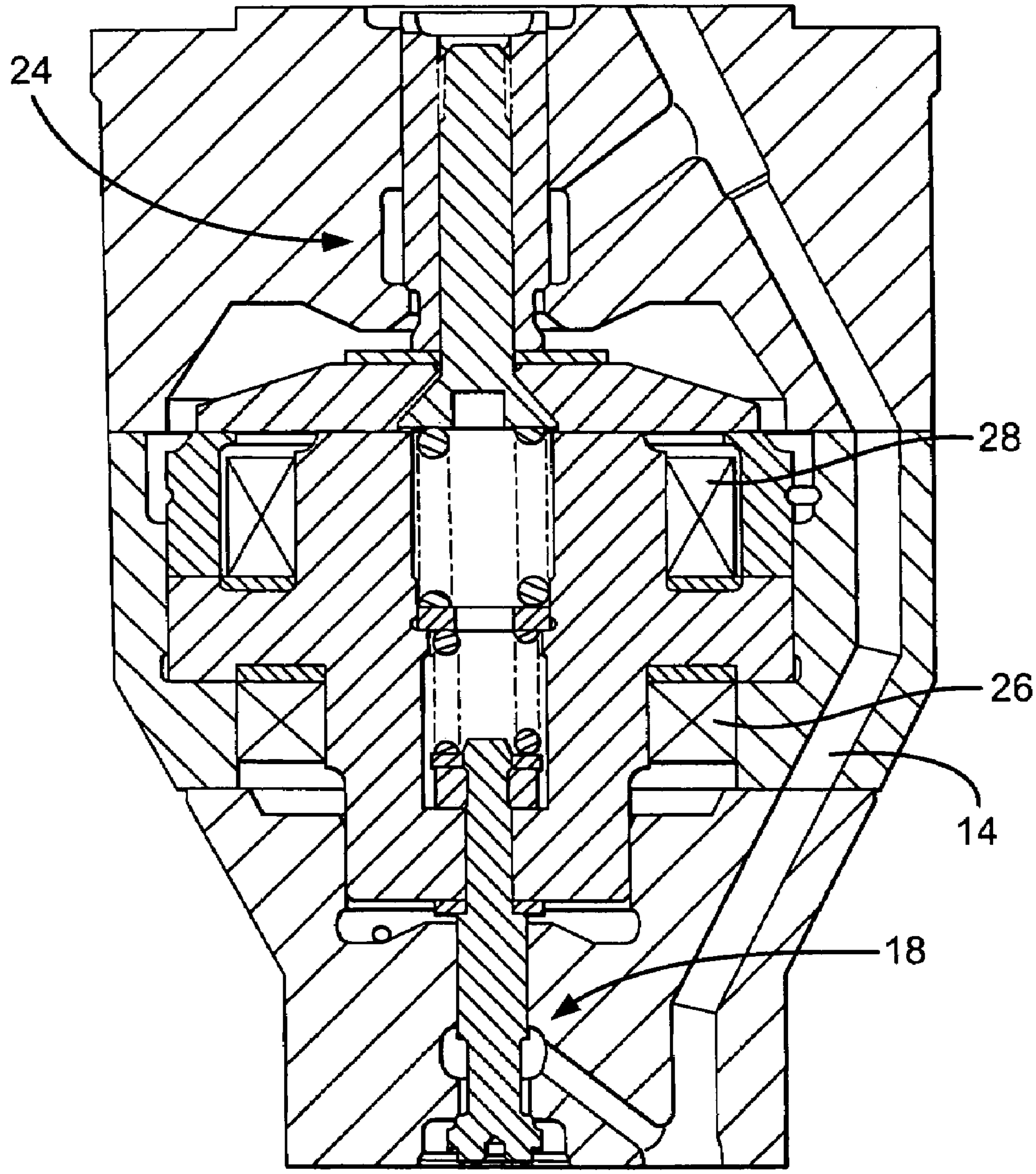
FIG. 2 is a sectional view of a part of another known fuel injector within which an actuator arrangement of the present invention may be used.

FIGS. 3 to 6 show an actuator assembly for use in a fuel injector of the type comprising a spill valve (drain valve) for controlling fuel pressure within an injector delivery chamber and a nozzle control valve for controlling injection. In particular, the actuator assembly in FIGS. 3 to 6 is for incorporation within an injector as shown in FIG. 2.

The actuator assembly includes a laminated core structure, referred to generally as 30, in the form of an inner pole. The inner pole will also be referred to as the 'inner core' of the actuator assembly. An outer pole 32, of generally annular or tubular like form, includes, around the circumference of its uppermost edge, a region of overhang or lip 34, which extends inwardly towards the centre of the outer pole annulus. A lower region 36 of the outer pole 32 takes the form of a downwardly depending skirt, which is shaped to co-operate with the outer profile of the inner core 30 to allow the parts to be mounted co-axially with one another within an injector housing (not shown), as described in further detail below.

Figure 4:
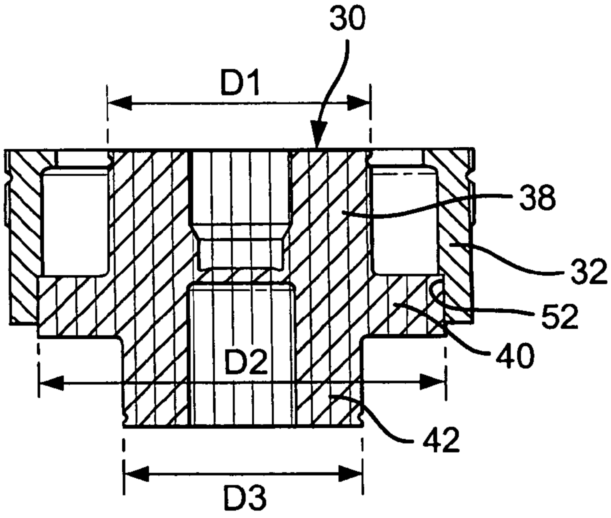
FIG. 4 is a sectional view of the actuator arrangement in FIG. 3.
Figure 5:
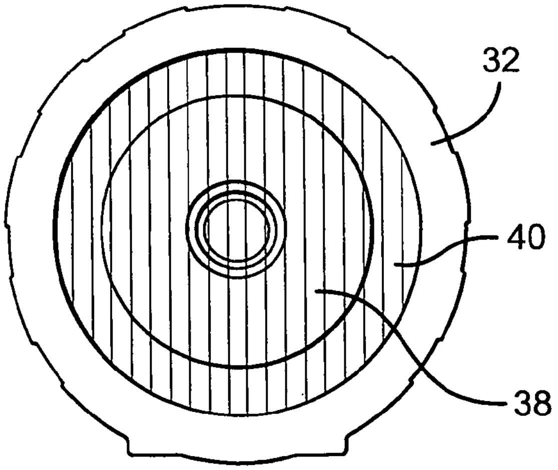
FIG. 5 is a plan view of the actuator arrangement in FIGS. 3 and 4.

Referring in particular to FIG. 4, the inner core 30 is shaped so as to define three distinct regions; an upper region 38 having a first diameter, D1, an intermediate region 40 having a second diameter, D2, and a lower region 42 having a third diameter, D3. The first and third diameters, D1, D3, of the upper and lower sections 38, 42, respectively, are substantially equal. The second diameter, D2, of the intermediate region 40 is greater than the first and third diameters, D1, D3, so that the intermediate region defines a collar 40 which projects circumferentially around the main, central body section of the inner core 30.

Between the upper lip 34 of the outer pole 32 and the upper surface of the inner core collar 40, the internal surface of the outer pole 32 and the outer surface of the inner core 30 define an annular volume or space 46 for receiving a first winding or solenoid (not shown) of the actuator assembly. As can be seen most clearly in FIG. 6, the collar 40 is shaped, at first and second diametrically opposite regions, to define first and second flattened surfaces, 48, 50 respectively. The lower skirt 36 of the outer pole 32 defines, on its inner surface, diametrically opposed flattened regions (only one of which—52—is shown), which align with the flattened surfaces 48, 50 of the collar 40 and engage therewith so that the outer pole 32 is a secure fit on the inner core 30.

Figure 3:
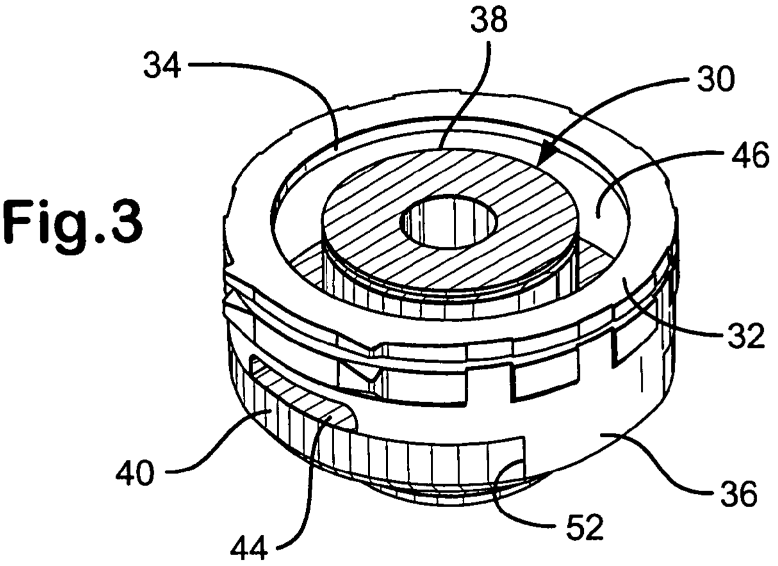
FIG. 3 is a perspective view of the actuator arrangement of the present invention, to illustrate a laminated core structure.
Figure 6:
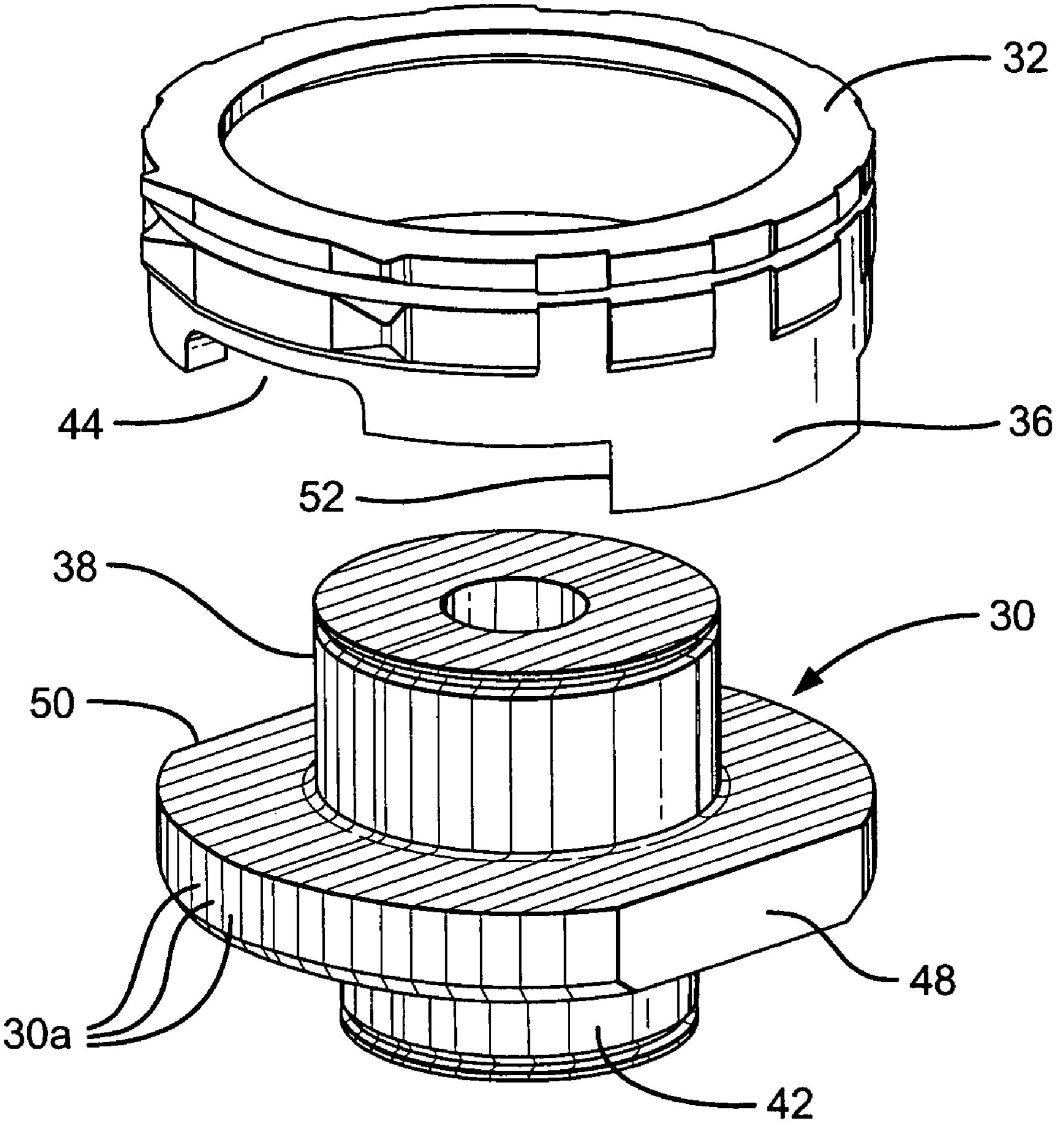
FIG. 6 is an exploded view of the actuator arrangement in FIGS. 3 to 5, to show the laminated core and the outer pole piece in more detail.

As can be seen most clearly in FIG. 3 or FIG. 6, the skirt region 36 of the outer pole 32 is provided with one or more recesses 44 in its lower surface which define, together with the upper surface of the inner core collar 40, an opening for receiving connecting leads or wires (not shown) to the winding housed within the volume 46.

As is known in electromagnetic actuators, the upper region 38 of the inner core 30 forms one of the poles of a double pole actuator for the spill valve of the injector, which generates a magnetic field upon application of an electric current to the winding. The resultant magnetic field drives movement of an armature (not shown) of the actuator, which is located above the inner core 30. Thus, energisation and de-energisation of the winding provides a means of controlling operation of the spill valve.

The lower region 42 of the inner core 30 provides a single pole of an actuator for the nozzle control valve of the injector. A second electromagnetic winding (not shown) for the lower region 42 of the core 30 would be wound around the lower region 42.

Figure 7:
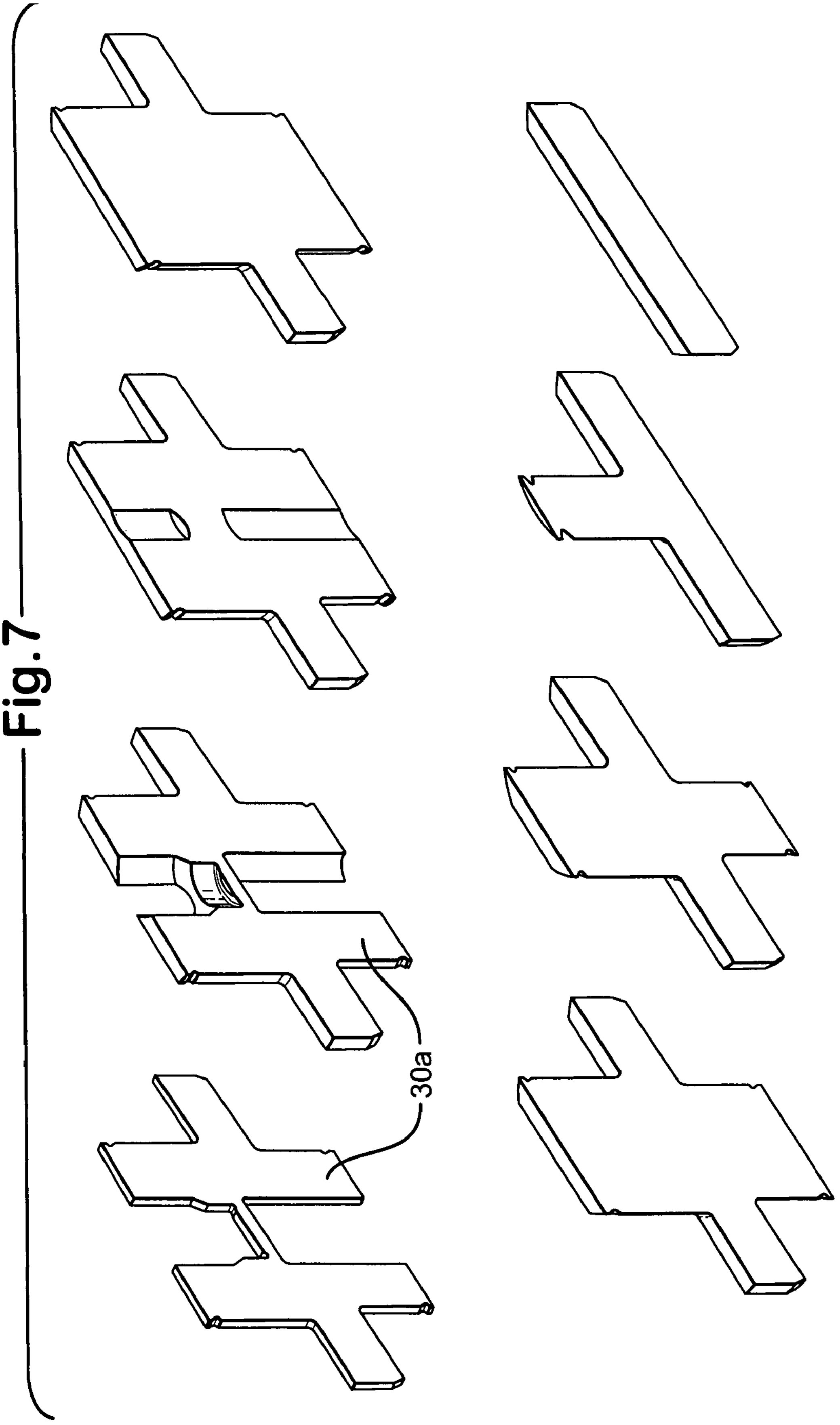
FIG. 7 is a series of sketches to illustrate the separate laminate parts of the laminated core structure.

It is a particular feature of the invention that the inner core 30 is laminated; that is to say the core 30 comprises a plurality of distinct laminate layers or parts. FIG. 7 illustrates the individual laminate parts 30*a* of the core 30 more clearly. For the avoidance of doubt, it is to be noted that FIG. 7 shows the laminates of one half of the inner core 30 only (i.e. from the centre of the core to the diametrically outermost edge). An identical arrangement of laminates is provided for the other half of the inner core 30 to maintain core symmetry. Each laminate 30*a* is of a different shape to its neighbouring laminate, although inner core profiles are envisaged in which some laminates are of common shape, depending upon the thickness of the laminate layers.

By way of example, it is envisaged that the laminates 30*a* of the inner core 30 are approximately 0.3 to 0.5 millimeters in thickness. For an actuator having a 20 mm diameter, for example, this would result in there being between 40 and 60 individual laminates 30*a* making up the core structure. Preferably, the laminates 30*a* may be formed from silicon iron (SiFe).

It is to be noted that it is only the inner core 30 of the actuator that is laminated, and not the outer pole 32. Magnetically, the inner core 30 tends to have less material to conduct magnetic flux, and so tends to reach saturation before other regions. Thus, the use of magnetically 'good', grain oriented material, such as that used for laminates, is advantageous. Conversely, the outer pole 32 is of relatively large circumference, and hence comprises a large amount of material, and so does not tend to saturate so readily. For this reason there is no requirement for the outer pole to be laminated. Furthermore, the ring-like outer pole 32 provides greater structural integrity, so that the co-operable surfaces of the inner core 30 and the outer pole 32 mate together well.

Magnetic performance is also improved.

The laminates 30*a* of the inner core 30 are preferably provided with a locking means (not shown) for locking neighbouring ones of the laminates 30*a* together. The locking means may be provided by forming a region of slight extra width on each laminate, which locks against or together with a co-operable formation on the neighbouring laminate.

In addition, or alternatively, the annular outer pole 32 itself may provide the locking function by virtue of its co-operation with the collar 40 on the inner core 30.

In an alternative embodiment to that shown, the connecting leads may pass through a hole or slot provided in one or more of the laminates to emerge, for example, at positions approximately 90 degrees from the recesses 44 on the inner core circumference.

In order to assemble the actuator, the following sequence of steps may be applied. Firstly, the laminated inner core 30 is assembled using known laminating procedures. Secondly, the first winding of the actuator is wound upon the upper region 38 of the inner core 30 to occupy the winding volume 46 and the second winding is wound around the lower region 42 of the core 30. Finally, the outer pole 32 is received over the top of the upper region 38, so that the inwardly facing flat surfaces (e.g. 52) of the outer pole skirt 36 mate with the flattened regions 48, 50 on the inner core collar 40.

Figure 1:
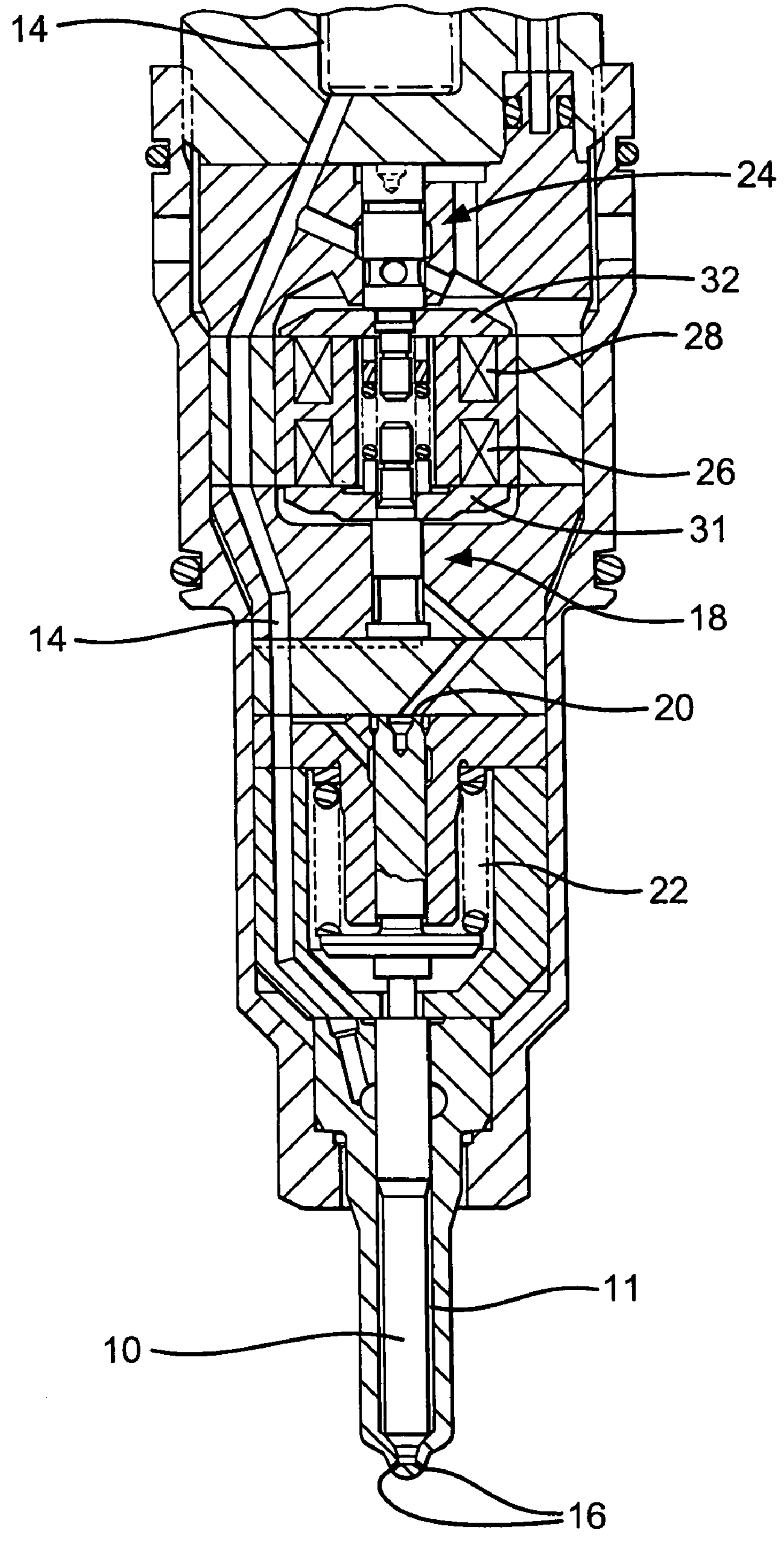
FIG. 1 is a sectional view of a known fuel injector within which an actuator arrangement of the present invention may be used.

In another embodiment of the invention (not shown), a twin actuator arrangement is proposed in which a second, outer pole is provided to encompass the lower region 32 of the inner core 30 and to define a second volume for the second winding (i.e. both the upper and lower core regions are part of a double pole arrangement). An example of such an injector is shown in FIG. 1. Here, the windings 26, 28 would be wound in the same direction, with the collar of the actuator's inner core defining a part of a common flux path for both windings.

In a twin double pole actuator arrangement of the above mentioned type, the first outer pole 32 may itself define both the first volume 46 for the first winding and the second volume for the second winding. For example, the first outer pole may be of extended length so as to extend below the collar 40 to surround the lower core region 42, or alternatively may be formed from two separate parts, one part defining the first volume and one part defining the second volume.

It will be appreciated that although the injectors have been described as those in which a spill valve is included, this need not be the case and equally the invention is applicable to a common rail injector in which only a nozzle control valve is provided to control the valve needle. Equally, the invention is applicable to an injector in which only a spill valve is provided, but without a nozzle control valve, in which case there is no requirement for a second winding on the lower core region 42, and, optionally, no requirement for the lower core region 42.

Having described the particularly preferred embodiments of the present invention, it is to be appreciated that these embodiments are exemplary only and that variations and modifications such as will occur to those possessed of the appropriate knowledge and skills may be made without departure from the scope of the invention as set forth previously. For example, it will be appreciated that references to energisation and de-energisation to windings are interchangeable so that, in an injector application, it may be either energisation of the winding or de-energisation of a winding that results in opening movement of the controlled valve.

The invention claimed is:

1. An actuator arrangement for use in a fuel injector of an internal combustion engine, the actuator arrangement comprising:

an inner core comprising a plurality of laminates, and a first outer pole for receiving at least a part of the inner core, the inner core and the first outer pole together defining a first volume for receiving a first electromagnetic winding.

2. The actuator arrangement as claimed in claim 1, wherein the inner core comprises an inner core body that carries a collar.

3. The actuator arrangement as claimed in claim 2, wherein the inner core body has a primary axis, the collar being carried part way along the primary axis so that an upper core region is on one side of the collar and a lower core region is on the other side of the collar.

4. The actuator arrangement as claimed in claim 3, wherein the upper core region is received within the first outer pole so as to define, together with the first outer pole, the first volume for receiving the first electromagnetic winding.

5. The actuator arrangement as claimed in claim 4, further comprising a second outer pole that receives the lower core region so as to define, together with the lower core region, a second volume for receiving a second electromagnetic winding.

6. The actuator arrangement as claimed in claim 4, wherein the first outer pole has an extended length so as to receive both the upper core region and the lower core region, thereby to define, together with the lower core region, a second volume for receiving a second electromagnetic winding.

7. The actuator arrangement as claimed in claim 4, wherein the first outer pole is formed in two parts, a first part defining the first volume and a second part defining a second volume for receiving a second electromagnetic winding.

8. The actuator arrangement as claimed in claim 2, wherein the collar includes diametrically opposed collar regions that engage with respective diametrically opposed internal surfaces of the first outer pole so that the inner core and the first outer pole fit together securely.

9. The actuator arrangement as claimed in claim 8, wherein the first outer pole (32) includes a downwardly depending skirt, an internal surface of the downwardly depending skirt defining the diametrically opposed internal surfaces for engagement with the collar regions.

10. The actuator arrangement as claimed in claim 1, wherein at least one of the laminates has an outer profile that is different from that of its neighboring laminate.

11. A fuel injector for use in an internal combustion engine, the fuel injector comprising:

a valve needle that is operable so as to control injection by the injector, a valve arrangement for controlling movement of the valve needle, and an actuator arrangement for controlling the valve arrangement, wherein the actuator arrangement includes an inner core comprising a plurality of laminates and a first outer pole for receiving at least a part of the inner core, wherein the inner core and the first outer pole together define a first volume for receiving a first electromagnetic winding, and whereby the valve arrangement is controlled by energization and/or de-energization of the first electromagnetic winding.

12. The injector as claimed in claim 11, wherein the inner core of the actuator arrangement comprises an inner core body that carries a collar.

13. The injector as claimed in claim 12, wherein the collar is carried part way along the axis of the inner core so that an upper core region is on one side of the collar and a lower core region is on the other side of the collar.

14. The injector as claimed in claim 13, wherein the upper core region is received within the first outer pole so as to define, together with the first outer pole, the first volume for receiving the first electromagnetic winding.

15. The injector as claimed in claim 14, wherein the valve arrangement includes a spill valve for controlling fuel pressure within an injector supply passage, thereby to control movement of the valve needle.

16. The injector as claimed in claim 14, wherein the valve arrangement includes a nozzle control valve for controlling fuel pressure in an injector control chamber, thereby to control movement of the valve needle.

17. The injector as claimed in claim 14, wherein the valve arrangement includes a spill valve for controlling fuel pressure within an injector supply passage and a nozzle control valve for controlling fuel pressure in an injector control chamber, thereby to control movement of the valve needle, whereby energization and/or de-energization of the first electromagnetic winding controls the spill valve, the injector further comprising a second electromagnetic winding, wound on the lower core region, whereby energization and/or de-energization of the second electromagnetic winding controls the nozzle control valve.

18. The injector as claimed in claim 17, further comprising a second outer pole that receives the lower core region to define, together with the lower core region, a second volume for receiving the second electromagnetic winding.

19. The injector as claimed in claim 17, wherein the first outer pole has an extended length to receive both the upper core region and the lower core region, thereby to define, together with the lower core region, a second volume for receiving the second electromagnetic winding.

20. The injector as claimed in claim 17, wherein the first outer pole is formed in two parts, a first part defining the first volume and a second part defining a second volume for receiving the second electromagnetic winding.

21. The injector as claimed in claim 12, wherein the collar of the actuator arrangement includes diametrically opposed collar regions that engage with respective diametrically internal surfaces of the first outer pole so that the inner core and first outer pole fit together securely.

22. The injector as claimed in claim 21, wherein the first outer pole of the actuator arrangement includes a downwardly depending skirt, an internal surface of the downwardly depending skirt defining the, diametrically opposed internal surfaces for engagement with the collar.

23. The injector as claimed in claim 11, wherein at least one of the laminates of the inner core has an outer profile that is different from that of its neighboring laminate.

24. A fuel injector for use in an internal combustion engine, the fuel injector comprising:

a valve needle that is movable towards and away from a seating so as to control injection by the injector, a spill valve arrangement for controlling fuel pressure in an injector delivery passage, a nozzle control valve arrangement for controlling fuel pressure in an injector control chamber so as to control movement of the valve needle, and an actuator arrangement for controlling both the spill valve arrangement and the nozzle control valve arrangement, wherein the actuator arrangement includes an inner core comprising a plurality of laminates and a first outer pole for receiving at least a part of the inner core, wherein the inner core further comprises an upper core region wound with a first electromagnetic winding and a lower core region wound with a second electromagnetic winding, and wherein the inner core and the first outer pole together define a first volume within which the first electromagnetic winding is housed.

* * * * *